W. H. MORENUS.
GRADING AND DITCHING MACHINE.
APPLICATION FILED APR. 6, 1911.
1,053,203.
Patented Feb. 18, 1913.
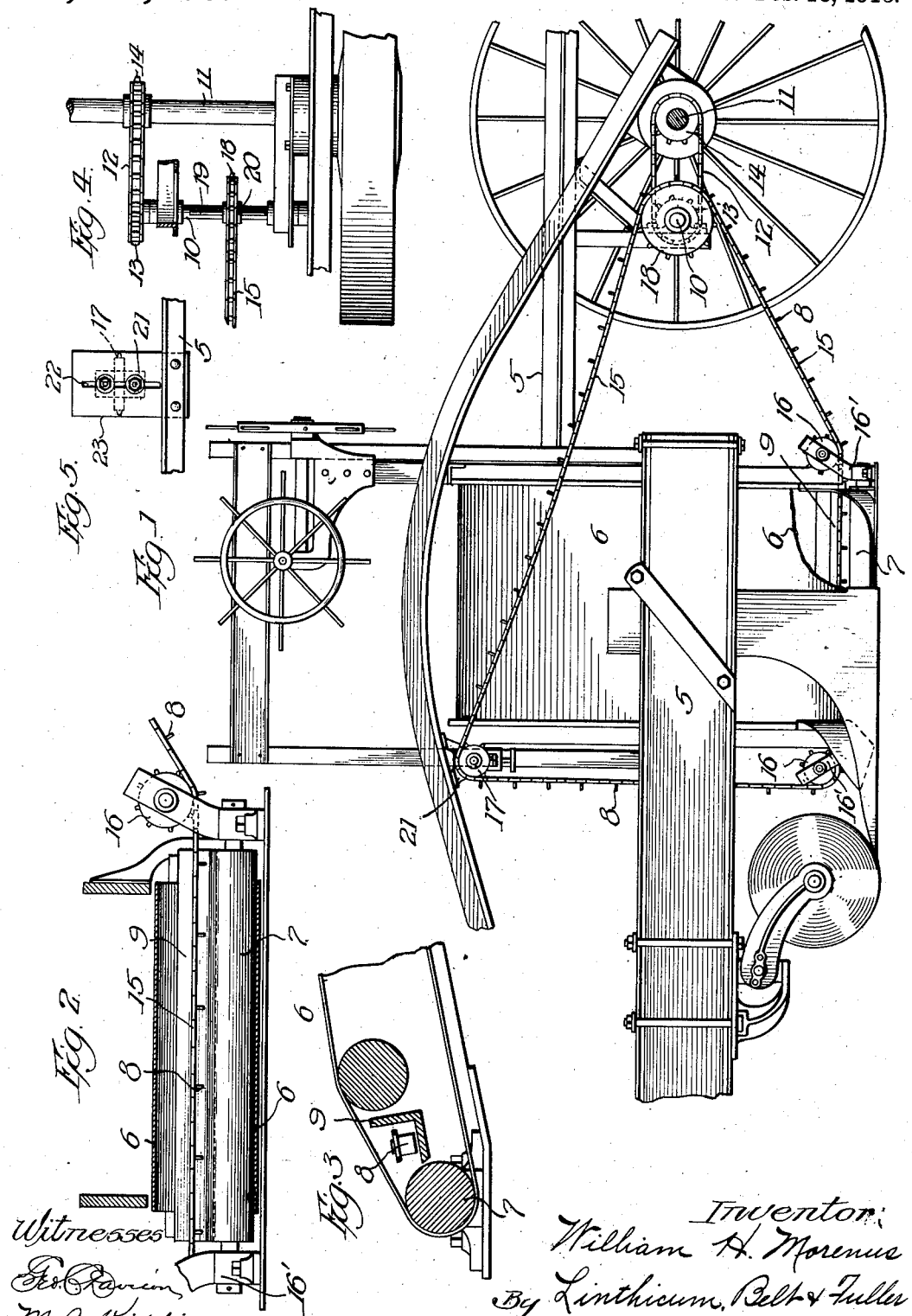

UNITED STATES PATENT OFFICE.

WILLIAM H. MORENUS, OF LAKE VIEW, IOWA, ASSIGNOR TO AUSTIN MANUFACTURING COMPANY, OF CHICAGO, ILLINOIS, A CORPORATION OF ILLINOIS.

GRADING AND DITCHING MACHINE.

1,053,203.  Specification of Letters Patent.  Patented Feb. 18, 1913.

Application filed April 6, 1911. Serial No. 619,198.

*To all whom it may concern:*

Be it known that I, WILLIAM H. MORENUS, a citizen of the United States, residing at Lake View, in the county of Sac and State of Iowa, have invented new and useful Improvements in Grading and Ditching Machines, of which the following is a specification.

This invention relates to grading and ditching machines of that type which embody an endless conveyer belt to receive the dirt from the plow or digger and carry it away to a point of discharge.

It has been found in practice that a considerable quantity of dirt will accumulate within the conveyer belt at the lower end thereof and various means have been provided for removing this dirt. Some of these means have been hand operated and in my Patent No. 667,551 dated February 5, 1901 I disclose a scraper for freeing the inner side of the upper leaf of the conveyer belt from adhering soil, a shelf or guard arranged between the belt leaves in position to receive the soil from the scraper, and a hand operated ejector arranged to travel over the scraper to remove the soil therefrom at the sides of the conveyer belt. Other means have been employed for the same purpose, such as an endless scraper belt operated by contact with the ground over which the machine travels, a screw conveyer, and an endless chain driven from the conveyer rollers. Some of these devices have been tried in actual use but none of them has been found commercially practical for doing the work required. When the machine is operating in gumbo or sticky soil the parts of these scraper devices will become clogged to such an extent that they are inoperative and it has been the practice to remove these devices from the machines after they have thus proven their inefficiency and to thereafter remove the accumulated dirt by hand.

The object of this invention is to provide a power operated scraper chain for removing the dirt which accumulates on the shelf within the conveyer and to run this chain above the conveyer and drive it from the rear axle of the machine continuously as the machine travels so that it may operate in all kinds of soil and without liability of becoming clogged or gummed up.

In the accompanying drawings illustrating my invention Figure 1 is a side elevation, partly in section, with the conveyer belt partly broken away, and showing as much of the machine with my invention embodied therewith as is necessary to understand the invention. Fig. 2 is a detail view of the lower end of the conveyer, partly in section. Fig. 3 is a transverse sectional view of the parts shown in Fig. 2. Fig. 4 is a detail plan view, partly in section, of the driving devices. Fig. 5 is a detail plan view of the supporting bracket for the upper sprocket roller.

Referring to the drawings, 5 designates generally the frame of the machine, 6 the conveyer belt which travels over the roller 7, 8 the scraper and 9 the shelf, all of these parts being old and well known. A countershaft 10 is supported from the main frame adjacent to the rear axle 11 and is driven from said axle by a sprocket chain 12 traveling on the sprocket wheels 13 and 14. The scraper chain 15 travels between the upper leaf of the conveyer belt and the shelf and over idle sprockets 16 at the sides of the belt, the idle sprocket 17 on the frame above the belt and over the driving sprocket 18 fastened on the counter-shaft. The sprockets 16 are supported in suitable brackets 16' on the conveyer belt frame. The driving sprocket is adjustable on the counter-shaft to which it is locked by a feather 19 and set screw 20. The upper sprocket 17 is supported in a bracket 21 which is fastened by bolts arranged in the slot 22 of a plate 23 secured to the main frame.

The conveyer of these machines is usually made so that its lower end can be adjusted to a position nearer to or farther away from the plow and the driving sprocket and the upper sprocket 17 are adjustably mounted so that their position can be changed as required to correspond with the position of the lower sprockets 16 and to cause the chain to travel in a vertical plane.

My invention is simple in construction and can be easily applied to machines already in use. The chain runs through the conveyer belt in one direction only and constantly removes the dirt which accumulates on the shelf. Sometimes the dirt is deposited by the plow on the conveyer belt to a height of two feet and for this reason I locate the upper sprocket 17 at a sufficient height above the conveyer belt to clear the dirt thereon. It will thus be observed that the scraper chain travels in contact with the dirt only while passing through the conveyer belt and as the chain is in constant operation while the machine is moving, being driven from the rear axle, there is no opportunity for the belt becoming clogged by any soil in which the machine can operate.

What I claim and desire to secure by Letters Patent is:

1. In a grading or ditching machine having a plow or digger, the combination of a main frame, a conveyer belt which receives soil from the plow or digger, a scraper and a shelf arranged within said belt at the lower end thereof, a sprocket above the conveyer belt, and an endless scraper chain provided with a plurality of outwardly extending scraping blades arranged to travel in a substantially vertical plane through the belt and above the shelf in one direction, and over the said sprocket and above the belt and shelf in the opposite direction, substantially as described.

2. In a grading or ditching machine having a plow or digger, the combination of a main frame, a conveyer belt which receives soil from the plow or digger, a scraper and a shelf arranged within said belt at the lower end thereof, a counter-shaft driven from the rear axle of the machine, a sprocket above the conveyer belt, and an endless scraper chain driven over said counter-shaft and traveling through the belt and over the shelf in one direction and over the belt and said sprocket in the other direction, substantially as described.

3. In a grading or ditching machine having a plow or digger, the combination of a main frame, a conveyer belt which receives soil from the plow or digger, a scraper and a shelf arranged within said belt at the lower end thereof, sprocket wheels at each end of the shelf, a sprocket wheel adjustably supported on the frame above the belt, a counter-shaft driven from the rear axle, a sprocket wheel adjustably mounted on said shaft, and an endless scraper chain trained over said sprocket wheels and traveling through the belt and over said shelf in one direction and over the belt in the other direction, substantially as described.

4. In a grading or ditching machine having a plow or digger, the combination of a main frame, a conveyer belt which receives soil from the plow or digger, a scraper and a shelf arranged within said belt at the lower end thereof, an idler above the conveyer belt, and an endless scraper chain arranged to travel in a substantially vertical plane through the belt and above the shelf in one direction, and over the said idler and above the belt and shelf in the opposite direction, substantially as described.

WILLIAM H. MORENUS.

Witnesses:
W<small>M</small>. O. BELT,
M. A. KIDDIE.